Dec. 25, 1962   C. H. WILLSEY   3,070,208
EGG BREAKING MACHINE
Original Filed May 16, 1955   6 Sheets-Sheet 1
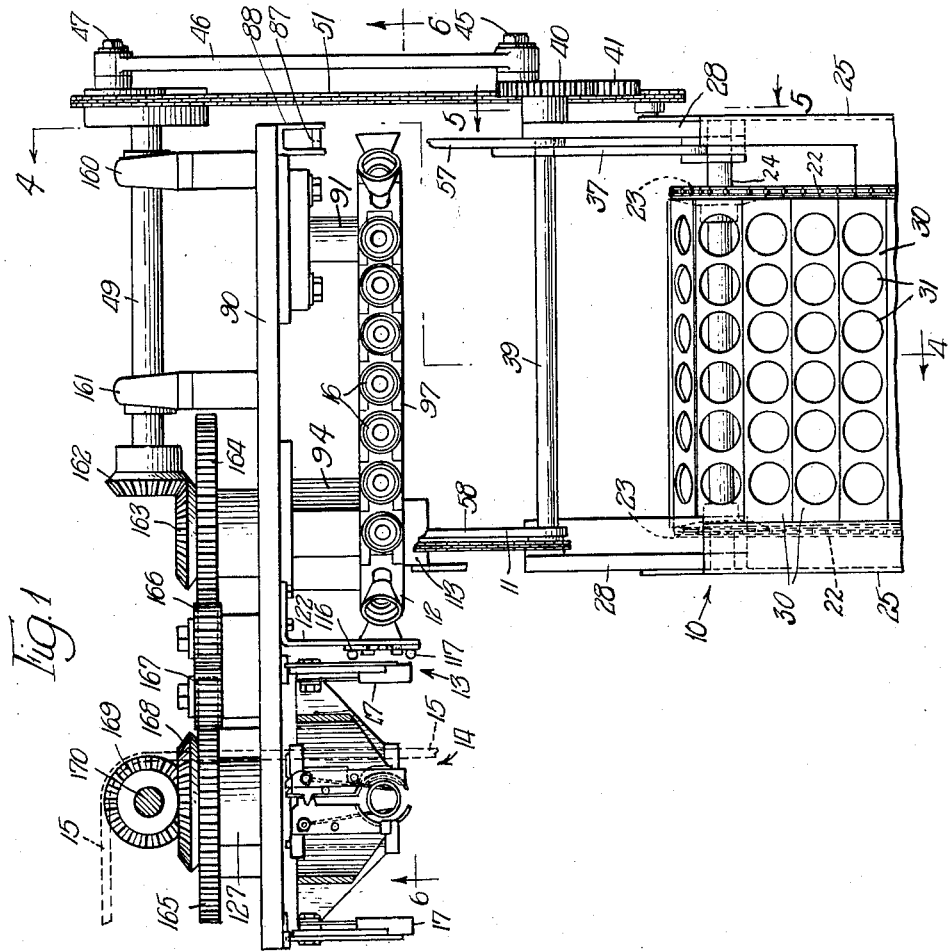
INVENTOR.
Charles H. Willsey,
BY
Cromwell, Greist & Warden
Attys.

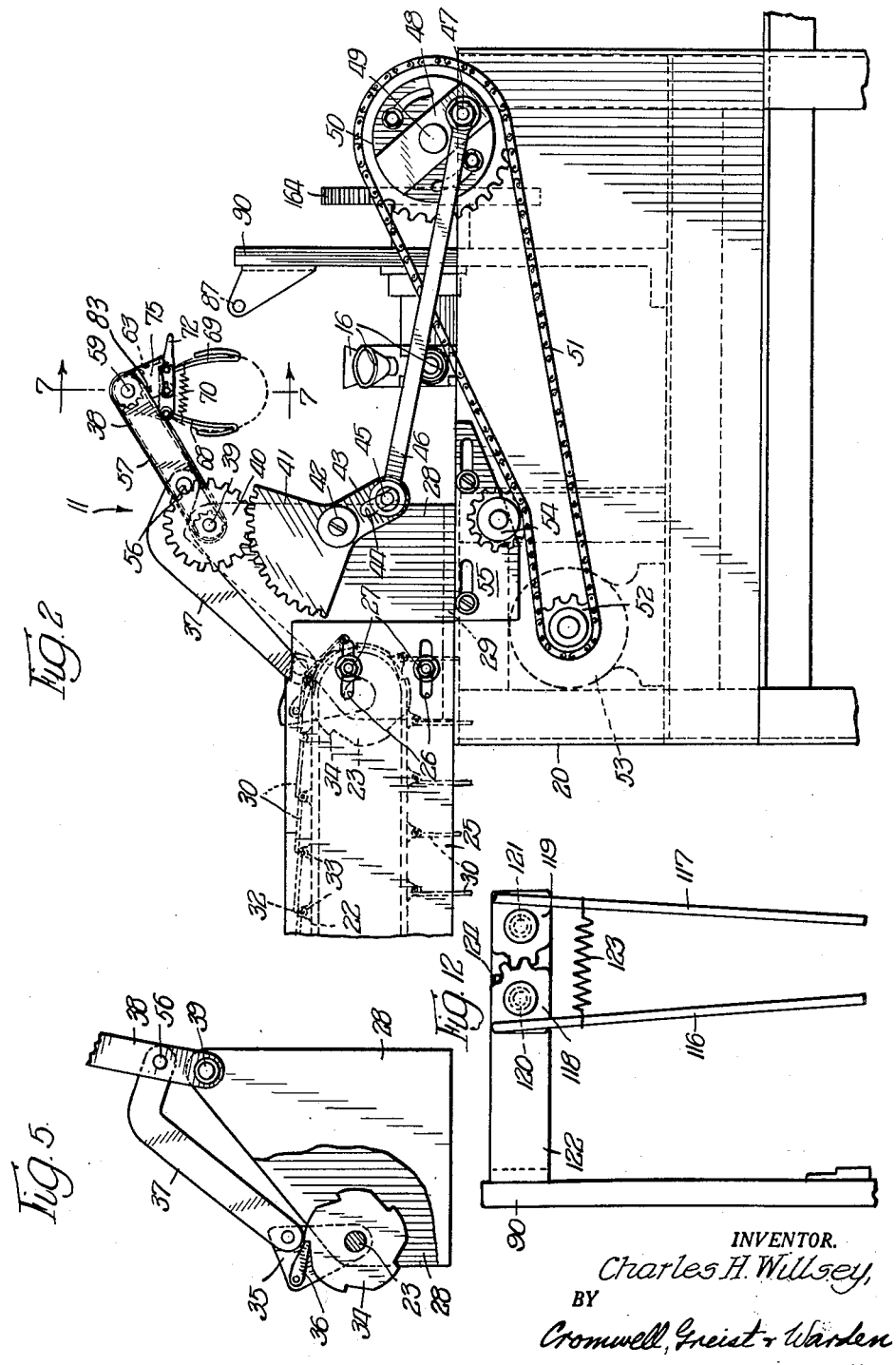

Dec. 25, 1962 C. H. WILLSEY 3,070,208
EGG BREAKING MACHINE
Original Filed May 16, 1955 6 Sheets-Sheet 3
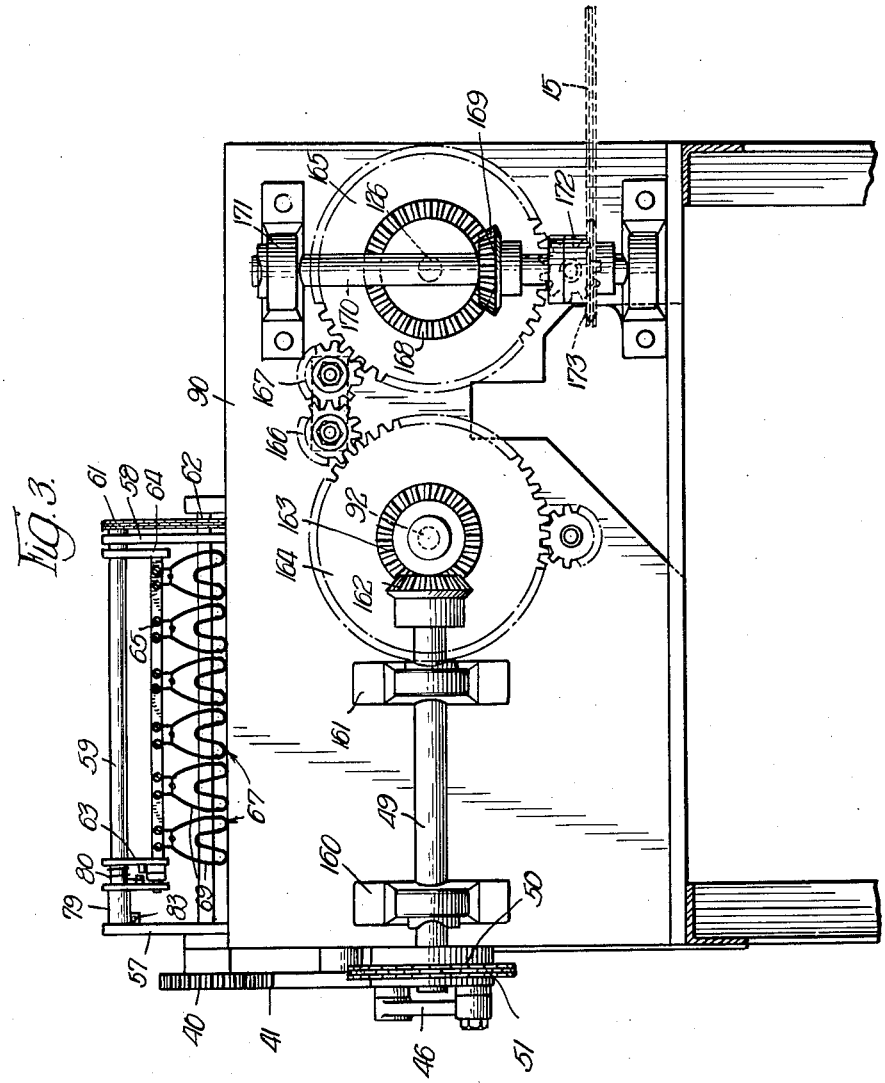
INVENTOR.
Charles H. Willsey
BY
Cromwell, Greist & Warden
Attys Dec. 25, 1962  C. H. WILLSEY  3,070,208
EGG BREAKING MACHINE
Original Filed May 16, 1955  6 Sheets-Sheet 4
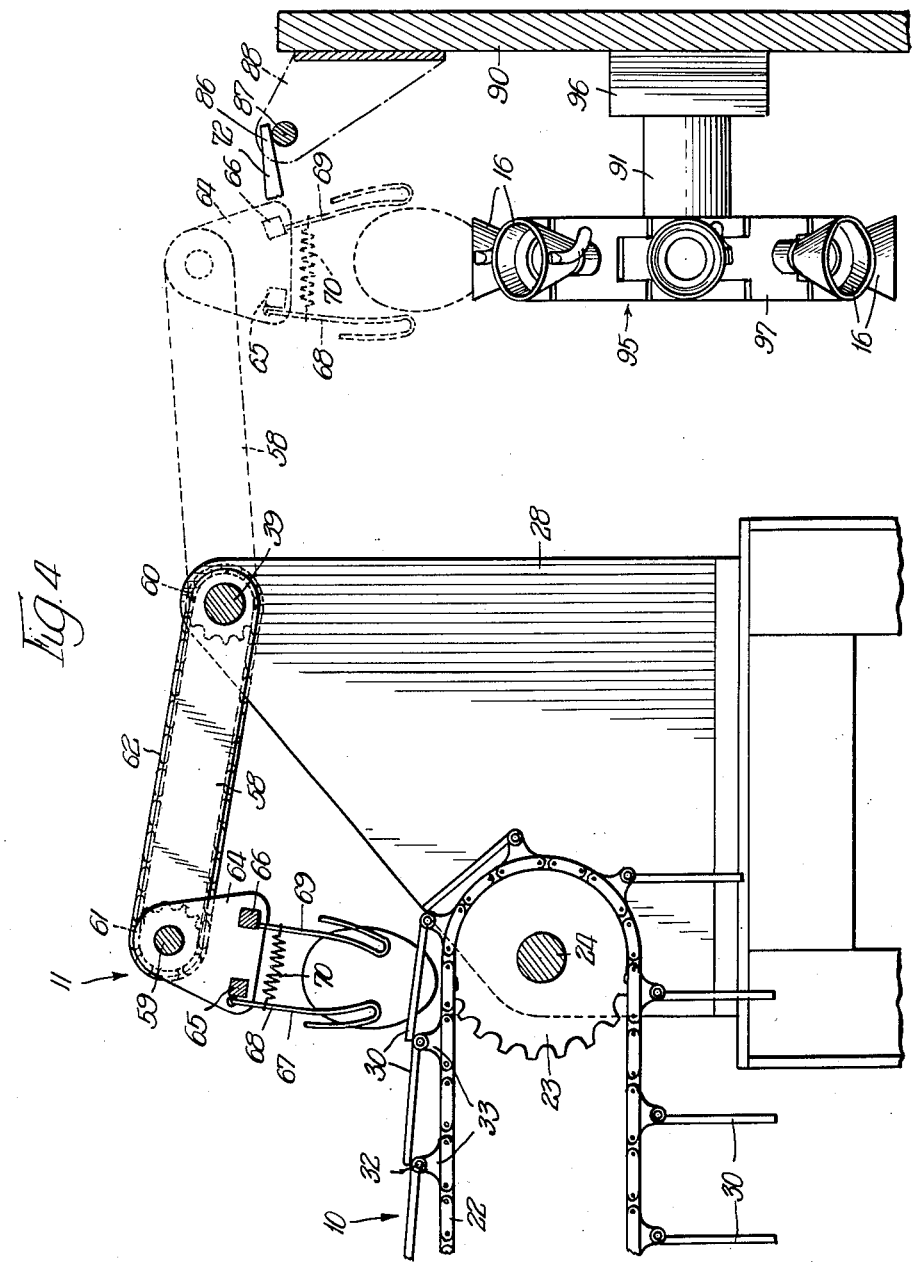
INVENTOR.
Charles H. Willsey,
BY
Cromwell, Greist + Warden
Attys Dec. 25, 1962 C. H. WILLSEY 3,070,208
EGG BREAKING MACHINE
Original Filed May 16, 1955 6 Sheets-Sheet 5
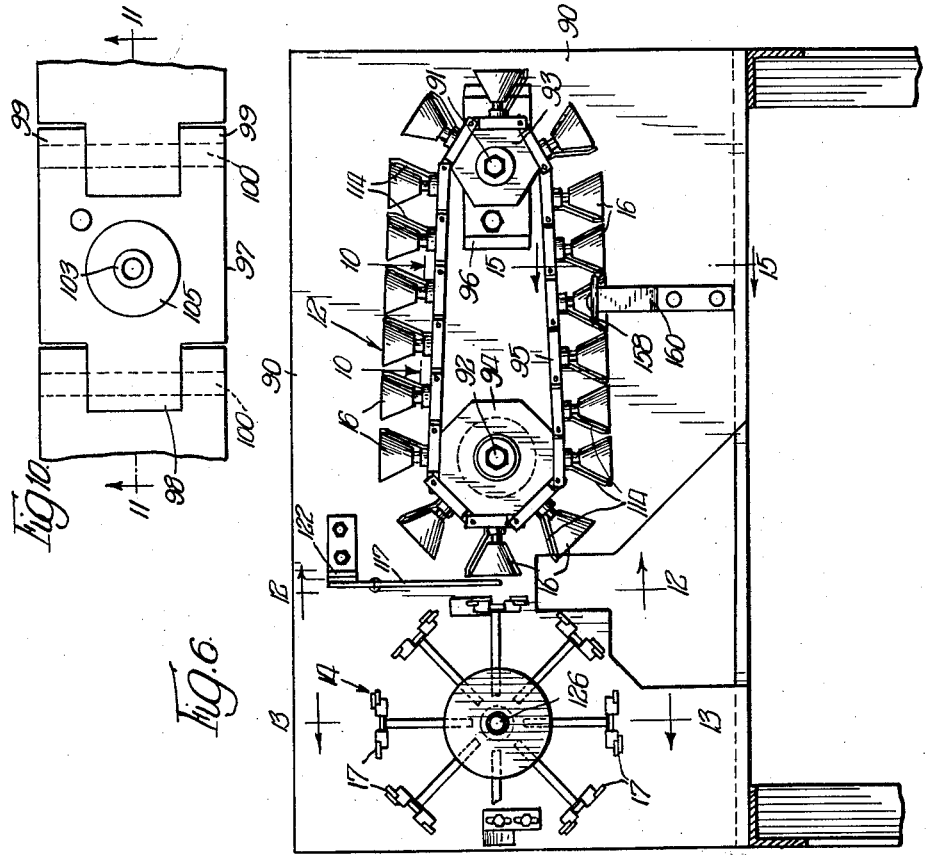
INVENTOR.
Charles H. Willsey,
BY
Cromwell, Greist & Warden
attys.

Dec. 25, 1962 C. H. WILLSEY 3,070,208
EGG BREAKING MACHINE
Original Filed May 16, 1955 6 Sheets-Sheet 6
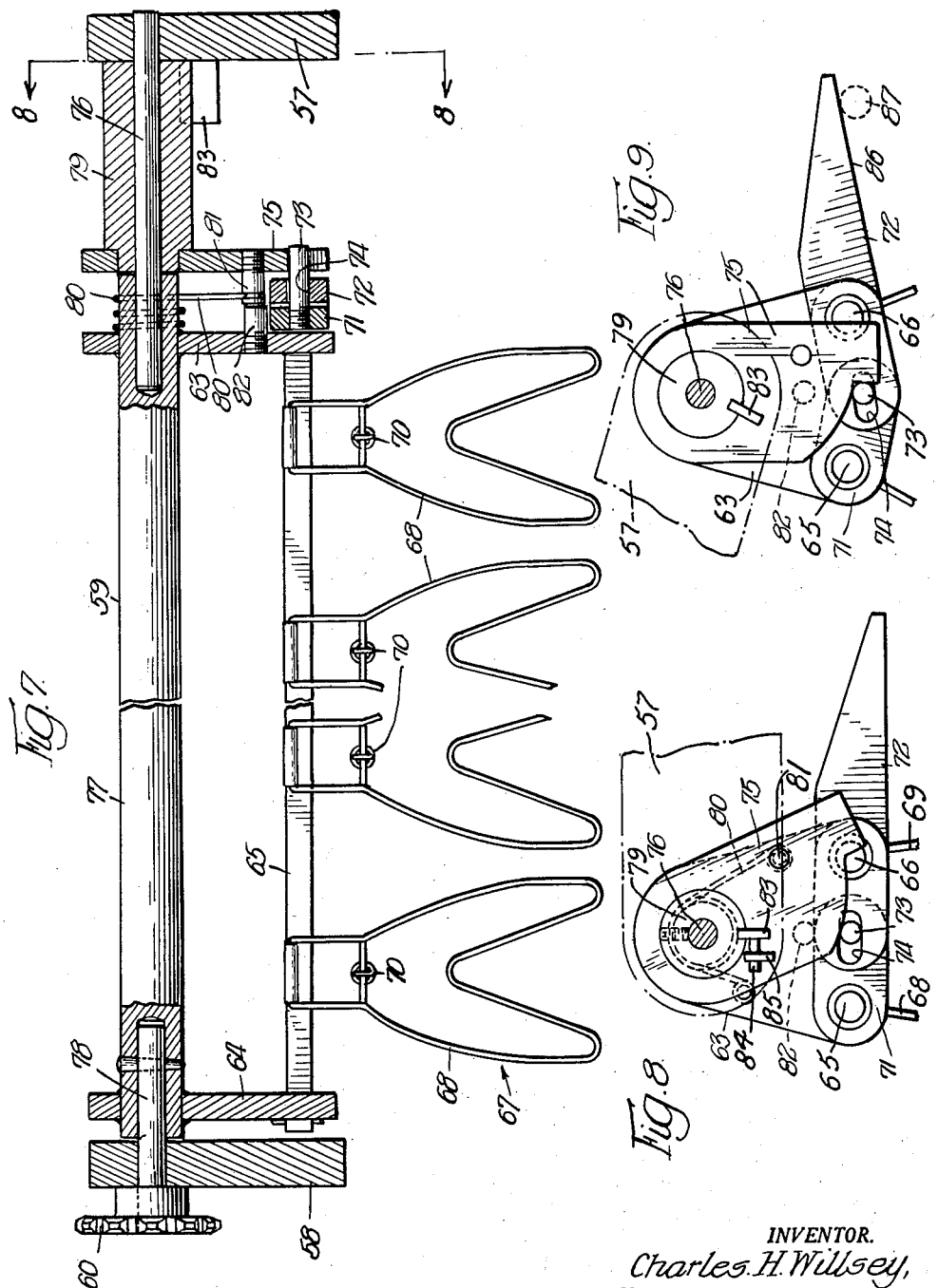
INVENTOR.
Charles H. Willsey,
BY
Cromwell, Greist & Warden
Attys

United States Patent Office 3,070,208
Patented Dec. 25, 1962

3,070,208
EGG BREAKING MACHINE
Charles H. Willsey, 940 Arter St., Topeka, Kans.
Application Mar. 5, 1957, Ser. No. 644,064, which is a division of application Ser. No. 508,542, May 16, 1955, now Patent No. 2,792,040, dated May 14, 1957. Divided and this application Aug. 3, 1959, Ser. No. 831,335
4 Claims. (Cl. 198—32)

This invention relates to egg handling apparatus and is more particularly concerned with improvements in a machine for cracking or breaking successive eggs and for separating the broken shell portions to deliver the contents therefrom to cooperating mechanism for separating the yokes from the whites.

This application is a division of application Serial No. 644,064, filed March 5, 1957, now Patent No. 2,921,667, which is a division of application Serial No. 508,542, filed May 16, 1955, now Patent No. 2,792,040.

It is a general object of the invention to provide an egg handling machine having an improved mechanism for advancing successive eggs to a cracking station for automatically cracking or breaking the shells of the eggs regardless of their size or shape and for thereafter separating the broken shell portions and delivering the contents by gravity to successive receptacles which are positioned at the cracking station by a cooperating conveyor mechanism.

It is a specific object of the invention to provide in an egg cracking machine a transfer mechanism for delivering a plurality of eggs arranged in row formation from a feed conveyor to a continuously moving cracking conveyor with the eggs being deposited on the cracking conveyor for advancing movement thereby in single file relation.

These and other objects and advantages of the invention will be apparent from a consideration of the egg handling machine which is shown by way of illustration in the accompanying drawings, wherein:

FIG. 1 is a plan view with portions broken away of a machine embodying the principal features of applicant's invention;

FIG. 2 is an elevation of one side of the machine to an enlarged scale showing particularly the mechanism for delivering the eggs to the cracking conveyor;

FIG. 3 is an elevation of another side of the machine showing particularly the main portions of the power drive mechanism;

FIG. 4 is a section taken generally on the line 4—4 of FIG. 1, to an enlarged scale;

FIG. 5 is a fragmentary detail view taken on the line 5—5 of FIG. 1, to an enlarged scale;

FIG. 6 is a section taken on the line 6—6 of FIG. 1, to an enlarged scale and with portions broken away;

FIG. 7 is a section taken on the line 7—7 of FIG. 2, to an enlarged scale;

FIG. 8 is a section taken on the line 8—8 of FIG. 7 but with the supporting frame in the egg pick up position as shown in FIG. 4;

FIG. 9 is a section taken in the same plane as FIG. 8 but with the supporting frame in the egg delivery position, the view showing the latch mechanism engaged and the egg gripping fingers in open position;

FIGS. 10 and 11 are detail sections, to an enlarged scale, illustrating the conveyor link plates and the egg gripping suction cups carried thereon; and FIG. 12 is a section taken on line 12—12 of FIG. 6, to an enlarged scale.

Referring particularly to FIG. 1 of the drawings the general arrangement and operation of the machine will first be described. It comprises a feed or loading conveyor 10 for supplying eggs in successive row arrangement, a transfer mechanism 11 for delivering successive rows of the eggs to an egg supporting conveyor mechanism 12 which advances the eggs to a cracking station indicated at 13, and a rotary head or turret 14 which carries mechanism for cooperating with the conveyor 12 to hold successive eggs at the cracking station 13 and mechanism for cracking the shells of the eggs so that the contents will be delivered therefrom by the separating movement of the shell portions to successive separating devices which are carried on an endless conveyor 15 in a path extending beneath the cracking station 13.

The loading or feeding conveyor 10 is arranged to move in a horizontal plane to receive the eggs on its upper run. The eggs are positioned on the conveyor 10 either manually or by automatic placing and delivering means (not shown). The conveyor 10 moves the eggs up to a position beneath the transfer mechanism 11 with eggs arranged in rows of six extending transversely of the conveyor. The transfer mechanism 11 picks up successive rows of eggs from the feeding conveyor 10 and moves approximately 180 degrees in a circular path to deliver the rows of eggs to the upper run of the conveyor mechanism 12 which is located in a vertical plane, with the upper run traveling forwardly along the end of the conveyor 10 or toward the left of the operator who is positioned adjacent the cracking station 13 in FIG. 1. The conveyor mechanism 12 receives the eggs with the ends thereof seated in a series of suction cups or holders 16 and advances the eggs in a single line around the leading end thereof to bring each successive egg into a generally horizontal position at the station 13 where the cracking occurs. Each egg is supported at the cracking station 13 with one end in a holding cup 16 on the conveyor 12 and with the other end with a cooperating holding device 17 on the rotary head 14 which is arranged adjacent the leading end of the conveyor 12. While held at the cracking station the successive eggs are broken, or cracked, and as the conveyors 12 and 14 continue their advancing movement the halves of the shells move around beneath the conveyor 12 and the rotary head 14, respectively, and the contents thereof is dumped into a separating device moved into position at station 13 by the separating conveyor 15.

The feed conveyor 10 and the transfer mechanism 11 are arranged at the end of the main frame 20 of the machine. The conveyor 10 comprises laterally spaced endless side chains 22 mounted at one end on sprockets 23, the latter being supported on a cross shaft 24 extending between the ends of longitudinally extending upstanding side support plates 25, the ends of which are supported on the main frame 20 in laterally spaced upstanding relation. The chains 22 are supported on similar sprockets (not shown) arranged at the other end of the conveyor. The upstanding side supporting plates 25 are provided with an end supporting structure (not shown) also at the other end of the conveyor. The side plates 25 are slotted at 26 to receive bolts 27 which secure the same to upstanding support brackets or plates 28 for the transfer mechanism 11, the latter having bottom flanges 29 which are secured to the main frame 20 so that the entire conveyor 10 may be readily disconnected and removed from the machine. The eggs are supported on a series of cross plates 30 each of which is provided with six holes 31, and each of the holes being adapted to support an egg with the long axis arranged in the vertical direction. The cross plates 30 are each pivotally mounted along the forward edge thereof on a cross shaft 32 which is pivotally supported on brackets 33 arranged on the top portions of the links on the side chains 22. The cross shaft 24 at the forward end of the conveyor carries at one end an operating or driving ratchet wheel 34 (FIG. 5). A saddle 35, pivotally mounted on the shaft 24 straddles the ratchet wheel 34 and carries a spring pressed dog 36 which engages the teeth on the ratchet wheel 34. The saddle 35 is oscillated by means of the link 37 which is pivotally connected at one end to the saddle 35 and at the other end to the transfer mechanism in a manner which will be described. At each operation of the transfer mechanism the ratchet 34 is rotated to advance the feed conveyor the distance necessary to position the next row of eggs for the transfer operation.

The egg transfer mechanism 11 comprises a frame 38 which is mounted on the cross shaft 39 at the upper end of the supporting plates 28. The cross shaft 39 extends transversely of the path of the conveyor 10 and at one end has a gear 40 secured thereto which engages with a segmental gear 41 pivoted on the stub shaft 42 and having an extending arm 43 which is slotted at 44 to receive a pin 45 on the end of an operating pitman or link 46. The link 46 has its other end pivoted at 47 to an eccentric 48 which is mounted on the end of a drive shaft 49. The drive shaft 49 carries a gear or sprocket 50 which is connected by a drive chain 51 to the drive pinion or sprocket 52 on a motor drive unit 53 which is adapted to be supported in any conventional manner beneath the frame 20 and which includes conventional speed reduction or control mechanisms. An idler gear 54 is adjustably mounted on the frame 20 by the supporting plate 55 for maintaining tension in the drive chain 51.

Each rotation of the drive shaft 49 oscillates the rock shaft 39 and the transfer frame 38. The operating arm 37 for the feed conveyor 10 is pivotally connected at its upper end at 56 to a side arm member 57 of the transfer frame 38 and each oscillation of the rock shaft 39 advances the conveyor 10 one step presenting a row of eggs for the next operation of the transfer device. The rock shaft 39 supports the frame 38 which includes the side arms 57 and 58 with the latter being connected at the outer ends by a smaller rock shaft 59. The rock shafts 39 and 59 are provided at corresponding ends with small sprockets 60 and 61 (FIG. 4) which are connected by a chain 62 so that upon oscillating movement of the frame 38 the smaller rock shaft 59 is rotated relative to the outer ends of the side frame members 57 and 58. The rock shaft 59 carries adjacent opposite ends triangular end plates 63 and 64 which are connected along their bottom edges by a pair of cross bars 65 and 66. The cross bars 65 and 66 are rotatably mounted on the plates 63 and 64 and support in depending side-by-side relation six egg gripping assemblies 67. The egg gripping assemblies 67 are adapted to engage and grip successive rows of eggs while they are in transit from the feeding conveyor 10 to the supporting conveyor 12.

Each of the egg gripper assemblies 67 comprises a pair of depending gripper fingers 68 and 69 which are generally U-shaped resilient wire members with the bight portion reversely bent and bowed, as shown, and with the ends of the leg portions connected to the cross bars 65 and 66, the connection between the legs of gripper finger 68 and bar 65 permitting the gripper finger 68 to pivot relative to the bar 65. The gripper fingers 68 and 69 are urged towards each other by a tension spring 70 which is connected between the leg portions thereof adjacent the cross bars 65 and 66. The tension spring 70 urges the gripper fingers 68 and 69 of each of the assemblies towards each other and into a closed position in which they grip the eggs with sufficient force to carry the same from the feed conveyor to the supporting conveyor 12.

The transfer mechanism 11 is provided with mechanism for controlling the opening and closing movements of the gripper assemblies 67 (FIGS. 2, 7, 8 and 9). The cross bars 65 and 66 extend at one end beyond the end plate member 63 and have mounted on their extended ends cooperating trip or cocking arm members 71 and 72. The arm member 71 carries a pin 73 which is received in a slot 74 in an overlapping tail portion of the arm member 72. The pin 73 extends beyond the outer face of the arm member 72 and is adapted to be locked against upward movement, or movement toward the rock shaft 59, by a cam release plate 75 which is rotatably mounted on an end section or pin 76 of the shaft 59. The shaft 59 comprises a main section 77 and end bearing sections or pins 76 and 78 which extend axially thereof and are journaled in the outer ends of the frame arms 57 and 58 and rotate with the main section 77. The end plates 63 and 64 are secured in fixed relation on the main shaft section 77. The one bearing pin 78 has fixed on its outer end the control sprocket 60. The bearing pin 76 at the other end of the shaft 59 carries in rotatable relation thereon the hub portion 79 of the cam release plate 75. A torsion spring 80 surrounds the end of the shaft member 77 in the space between the end plate 63 and the cam release plate 75 with one end tied to the latter by a pin 81 and the other end secured to the end plate 63. The spring 80 urges the plate 75 in the clockwise direction in FIG. 8 into latching position or relation with the projecting end of the pin 73 while the pin 73 is urged in the upward direction by action of springs 70. The upward movement of the overlapping ends of the arms 71 and 72 is limited by a stop pin 82 on the end plate 63. When the latch plate 75 is in the position shown in FIG. 9 the egg gripping assemblies 67 are latched with the gripping fingers 68 and 69 held in open position. When the latch plate 75 is rotated counterclockwise as in FIG. 8 the springs 70 move the fingers 68 and 69 to closed or egg gripping position. The latch plate 75 carries a pin or arm 83 which projects radially of the hub portion 79 and is adapted to be engaged by a stop pin 84 which is adjustably secured in a holder member 85 mounted on the frame arm 57. The stop pin 84 engages the arm 83 on the hub 79 of the latch plate 75 and rotates the latter out of latching position against the action of the spring 80 when the frame 38 is moved to position the gripper assemblies 67 for picking up from the conveyor 10 a line of eggs. As the frame 38 is oscillated to carry the eggs from the conveyor 10 to the conveyor 12 the extending end 86 of the trip member 72 engages with a cam release roller 87 which is mounted on a bracket 88 extending from the vertical supporting or frame plate 90, the conveyor 12 being supported on the front face of the latter. As the arm 72 engages the cam roller 87 and rotates about its axis the pin 73 is pulled downwardly and the bars 65 and 66 carrying the gripper arms 68 and 69 of each of the gripper assemblies 67 are rotated against the action of the springs 70 and move the gripper fingers 68 and 69 to the open position. The plate 75 is held in latching position by the spring 80 as the assemblies 67 rise from the conveyor 12 on their return movement with the gripper fingers 68 and 69 of the assemblies 67 being held in open position. At the completion of the return movement the stop pin 84 engages the arm 83 on the hub 79 of latch plate 75 and moves the latch plate 75 out of latching position to permit the pin 73 to rise due to the action of the connecting springs 70 between the gripper fingers 68 and 69 which permits the fingers to close on the eggs in the conveyor 10. The delivery operation is then repeated.

The vertical frame support plate 90 on which conveyor 12 is supported is generally rectangular in shape and is secured to the base frame 20 in any desired manner. Two spaced shafts 91 and 92 are journaled in the plate 90 and have mounted thereon drum or sprocket formations 93 and 94 which support the endless chain 95 of the conveyor 12. The drum formation 93 which is carried by the shaft 91 forms an idler supporting drum and the shaft 91 is adjustably mounted on the support plate 90 by bracket 96 to provide the proper tension in the conveyor chain 95. The other conveyor supporting drum 94 which is mounted on shaft 92 forms the drive member for the conveyor with the shaft 92 being connected to the power drive for the machine.

The conveyor chain 95 comprises a series of connected link plate members 97 which are adapted to seat on the supporting drums 93 and 94. The drum 93 is hexagonal in section, providing around its periphery six seats for the chain forming members 97, and the drum 94 is octagonal in section, providing on its periphery eight seats for receiving the chain forming members 97.

The conveyor 12 comprises a plurality of chain plates 97 (FIGS. 10 and 11) each of which has a central pivot receiving tongue 98 at one edge and a pair of laterally spaced pivot bearing tongues 99 at the opposite edge with adjacent plates being connected in chain formation by pivot pins 100. Each of the link plates 97 carries one of the suction cups 16. Each suction cup 16 comprises a funnel-shaped rubber section 101 and a tubular base section 102 which is mounted on a tubular nipple formation 103 extending outwardly of the plate 97. The tubular nipple 103 is part of a connector member 104 which has a flange or shoulder 105 which seats against the surface of the plate 97 and a threaded stem 106 which engages in a threaded aperture 107 in the plate 97. The stem 106 terminates in a tooth-like end formation 108 which projects from the lower face of the plate 97 and which is adapted to engage or seat in a cooperating socket formation or recess 109 in the face 110 of the conveyor end support member 94. The interengagement of the tooth formations 108 in the socket formations 109 insures positive movement of the conveyor 12 since the action is the same as a chain and sprocket connection between the link forming chain plates 97 and the sprocket forming end support member 94. The cup member 101 is provided with an internal flange or shoulder 111 which, when the cup is positioned on the nipple 103, is in spaced relation to the end of the nipple 103 to prevent damage to the egg which could otherwise occur through engagement of the same with the end of the nipple. Suction is, of course, applied through the passageway internally of the nipple 103 to be effective on the end of an egg positioned in the cup member 101 and to hold the same in the cup. The flange 111 also cooperates with the vacuum pull on the end of the egg to force the shell together in the case of a cracked egg and prevent loss of albumen which would otherwise occur due to the action of the vacuum. The conveyor end support or drum 94 is provided with a vacuum passageway 112 having a radial portion terminating in the socket formation 109 in the center of each face or seat 110 for the conveyor chain plates 97. The tooth formation 108 and the cooperating socket formation 109 are shaped to form a seal between the surfaces thereof while the plate 97 is seated on surface 110 of the drum 94 and the passageway 112 of the latter is connected to a suitable source of vacuum by means of a suction box 113 (FIG. 1) which is mounted at the end of the drum 94. The suction box 113 is provided with a suitable port (not shown) opening on the inner face which engages with the outer face of the drum 94, which port is aligned with the inner opening of the terminals of the passageways 112 for a portion of the movement of the drum 94 around the end of the conveyor. The suction box 113 is connected by suitable connecting members with a source of vacuum (not shown). As each plate 97 passes around the drum 94 suction is applied through the passageway 112 in the drum 94 to the cup member 101 which holds the one end of the egg in position therein. The other end of the egg is supported when it reaches the cracking position by mechanism which will be described subsequently.

Each conveyor chain plate 97 is provided with an upstanding pin 114 which has a curved upper portion 115 positioned closely adjacent the trailing edge of the cup 101 and which steadies the cup and the egg therein as it approaches the cracking station 13 and is centered or guided by a pair of depending guide rods 116 and 117 (FIG. 12). The guide rods 116 and 117 are mounted at their upper ends on gear segments 118 and 119 which are mounted on the pivots 120 and 121 which are provided on a plate-like bracket 122 extending outwardly from the face of the frame support plate 90. The rods are connected by a tension spring 123 adjacent their upper ends and a stop pin 124 is provided to limit their movement relative to each other. The eggs move between the rods, which are resiliently urged toward each other by the spring 123, as they approach the cracking station, and are centered for engagement of the free ends by the cooperating gripper mechanisms on the head 14.

As each egg moves around the end of the conveyor mechanism 12 with one end seated in a suction cup 16 thereon the opposite end is engaged by a cooperating holding or gripping mechanism 17 on the rotary head 14. The rotary head mechanism 14 comprises a plate holder 125 which is mounted on a shaft 126 supported in a bearing 127 in the vertical support plate 90. The plate holder 125 and other details of the head 14 are described in the parent application now Patent No. 2,792,040.

The shaft 92 for the supporting drum 94 which operates the conveyor 12 and the shaft 126 for the cracking head 14 extend through the frame support plate 90 and are driven by suitable connections from the drive shaft 49. The drive shaft 49 is supported in horizontally extending relation in a pair of bearing brackets 160 and 161 which extend rearwardly of the plate 90. A beveled gear 162 is mounted on the shaft 49 which engages with a beveled gear 163 on the shaft 92 and drives the same. The shaft 92 carries a gear 164 which is connected in driving relation with a similar gear 165 on the shaft 126 by means of a pair of connecting idler pinions 166 and 167. The shaft 126 carries a beveled pinion 168 which drives the pinion 169 on a vertical shaft 170 supported at its upper and lower ends by the bearing brackets 171 and 172 and carrying at its lower end a sprocket 173 for operating the separating conveyor 15.

I claim:

1. Mechanism for transferring successive rows of eggs from an intermittently operating feed conveyor on which the eggs are arranged in successive transversely extending rows to an elongate continuously moving endless carrying conveyor which is arranged to move in a path extending transversely of the end of the feed conveyor and which is provided with longitudinally spaced egg receiving cups, said mechanism comprising a carrying frame for egg gripping assemblies mounted between the end of the feed conveyor and the carrying conveyor, a plurality of egg gripping finger assemblies mounted in row forming relation on the outer end of said carrying frame, said carrying frame being pivotally mounted so as to swing said finger assemblies from a position adjacent the end of the feed conveyor where said finger assemblies are adapted to receive a row of eggs to a position above the upper run of the carrying conveyor where the eggs are released for deposit in the egg receiving cups, said finger assemblies each comprising a pair of resilient wire fingers and said carrying frame comprising spaced, rotatable cross bars on which said wire fingers are mounted in paired relation, the fingers of each pair thereof being oppositely disposed, and means to urge the fingers of each pair thereof toward each other so as to grip a row of eggs on the feed conveyor when the finger assemblies are positioned adjacent the feed conveyor, and means to rotate said cross bars when the finger assemblies are positioned above the carrying conveyor so as to swing said wire fingers away from each other and release the eggs for deposit in the cups on the carrying conveyor.

2. Mechanism for transferring successive rows of eggs from an intermittently operating horizontal feed conveyor on which the eggs are arranged in successive transversely extending rows to an elongate continuously moving endless carrying conveyor which is arranged to move in a horizontal path extending transversely of the end of the feed conveyor and which is provided with longitudinally spaced egg receiving cups, said mechanism comprising a carrying frame mounted for swinging movement between the end of the feed conveyor and the cup carrying conveyor, a plurality of egg gripping assemblies mounted in row forming relation on said carrying frame, each of said assemblies comprising a pair of finger members pivotally mounted in opposed relation, said carrying frame being mounted to move said gripping assemblies from a position adjacent the end of the feed conveyor where the gripping assemblies are adapted to receive a row of eggs to a position adjacent the upper run of the carrying conveyor where the eggs are deposited in the egg receiving cups, spring means connecting the finger members of each of said gripping assemblies and swinging said gripping assemblies into egg gripping position, means comprising arm members connected to corresponding finger members of each of said gripping assemblies, means for swinging said arm members relative to each other and in timed relation to the movement of said carrying frame to cause the assemblies to open up to receive a row of eggs when the carrying frame moves to egg receiving position adjacent the feed conveyor and thereafter to close the assemblies while they are moved from the end of the feed conveyor to the carrying conveyor by said carrying frame and means to open the assemblies for depositing the eggs in the cups on the carrying conveyor when the carrying frame moves to egg depositing position.

3. Mechanism for transferring successive rows of eggs from an intermittently operating horizontal feed conveyor on which the eggs are arranged in successive transversely extending rows to an elongate continuously moving vertically disposed endless carrying conveyor which is arranged to move in a path extending transversely of the end of the feed conveyor and which is provided with longitudinally spaced egg receiving devices, said mechanism comprising a swingably mounted carrying frame, a plurality of egg gripping assemblies mounted in row forming relation on said carrying frame, said frame being operated to reciprocate said gripping assemblies between a position adjacent the feed conveyor where said gripping assemblies are adapted to receive a row of eggs to a position above the upper run of the carrying conveyor where the eggs are released for deposit in the egg receiving devices, said gripping assemblies each comprising a pair of resilient wire fingers and said frame having spaced rotatably mounted cross bars on which said fingers are mounted in pairs with the fingers of each pair in oppositely disposed relation, a spring urging the fingers of each pair thereof toward each other, connecting arm members on said cross bar, and means on one of said connecting arm members for engagement with an abutment forming member on said carrying conveyor whereby to rotate the cross bars and swing the gripping fingers away from each other and into an open position for gripping a row of eggs when said gripping assemblies are moved to adjacent said feed conveyor and an abutment forming member adjacent said carrying conveyor for engaging one of said arm members when said gripping assemblies are moved to adajacent said carrying conveyor so as to rotate said cross bars and deposit the eggs in the egg receiving devices.

4. Mechanism for transferring successive rows of eggs from an intermittently operating horizontal feed conveyor on which the eggs are arranged in successive transversely extending rows to an elongate continuously moving vertically disposed endless carrying conveyor which is arranged to move in a path extending transversely of the end of the feed conveyor and which is provided with a series of egg receiving cups, said mechanism comprising a carrying frame swingably mounted at its inner end, a plurality of egg gripping assemblies mounted in row forming transversely spaced relation on the outer end of said carrying frame, means to operate said carrying frame to swing said gripping assemblies from a position adjacent the end of the feed conveyor where the gripping assemblies are adapted to receive a row of eggs to a position above the upper run of the carrying conveyor where the gripping assemblies are adapted to release the eggs for deposit in the egg receiving cups on the upper run of the carrying conveyor, said gripping assemblies each comprising a pair of curved fingers of resilient material and said frame comprising rotatably mounted spaced cross bars on which said fingers are secured with the fingers of each pair thereof in oppositely disposed relation, one finger of each pair thereof being fixed on one of said cross bars and the other finger being hinged to the other cross bars, a tension spring urging the fingers of each pair thereof toward each other, trip members on end portions of said cross bars, means including a projecting pin connecting said trip members, one of said trip members having an arm forming extension, a member adapted to be positioned adjacent said feed conveyor and engageable with said connecting pin for rotating the cross bars to swing the gripping fingers away from each other and open the same for gripping a row of eggs on the feed conveyor and a fixed member positioned adjacent said carrying conveyor for engaging said arm extension to rotate said cross bars and move said fingers away from each other when the fingers are in position above said carrying conveyor for releasing the eggs for deposit in the cups on the carrying conveyor.

References Cited in the file of this patent
UNITED STATES PATENTS

| | | |
|---|---|---|
| 1,766,574 | Westin | June 24, 1930 |
| 2,071,859 | Steiner | Feb. 23, 1937 |
| 2,714,523 | Bliss | Aug. 2, 1955 |
| 2,792,040 | Willsey | May 14, 1957 |
| 2,895,587 | Willsey | July 21, 1959 |